Patented May 15, 1923.

1,455,679

UNITED STATES PATENT OFFICE.

WILLIAM HENRY STOKES, OF COVENTRY, ENGLAND, ASSIGNOR TO COURTAULDS LIMITED, OF LONDON, ENGLAND.

PREPARATION OF SULPHURIC ACID STARCH COMPOSITION.

No Drawing.   Application filed March 31, 1922.   Serial No. 548,526.

*To all whom it may concern:*

Be it known that I, WILLIAM HENRY STOKES, a subject of the King of Great Britain, residing at 10 Lydgate Road, in the city of Coventry, England, have invented new and useful Preparation of Sulphuric Acid Starch Composition, of which the following is a specification.

When starch, or starchy matter, is mixed with fairly concentrated sulphuric acid (containing say 60 per cent $H_2SO_4$) the starch gelatinizes and forms lumps, which cannot, or only with great difficulty can, be mixed with the sulphuric acid, so as to yield a homogeneous mixture. Such mixture, preferably diluted with water, may be used to advantage in the preparation of, or as an addition to, a setting bath for use in the manufacture of threads, filaments, strips, films, etc., from viscose, as mentioned in the copending application of M. T. Callimachi, Ser. No. 548,477 filed herewith, patented March 27, 1923 under No. 1,449,380.

According to the present invention this difficulty is overcome by mixing the starch, or starchy matter, in a finely-divided condition, with sulphuric acid of such dilution and, at such moderate temperature, that no gelatinization takes place, and then pouring rapidly into the mixture thus obtained, and whilst stirring, sufficient concentrated sulphuric acid to bring the mixture to the desired concentration. The solution thickens at first, but in a very short time, becomes thin and, on continued stirring, is obtained in a good homogeneous condition. The concentrated sulphuric acid is to be added rapidly, so that at any rate by far the greater part thereof has been introduced before the thickening has proceeded to any considerable extent. If the said concentrated acid be run in slowly, local thickening takes place to such a degree that it is no longer possible to stir the mass. The total quantity of acid used should be at least about 75 parts by weight of pure sulphuric acid to every 100 parts by weight of starch.

As a general rule, the temperature of the mixture, during the addition of the concentrated sulphuric acid, should not be allowed to rise considerably, for instance, it should not be allowed to rise above a temperature at which charring of the organic material is likely to occur. It is preferred to cool the whole mass during the mixing, and this cooling may be effected, for instance, by means of cold water passing through coils in the mixing vessel.

The concentrations of the two quantities of sulphuric acid, that is to say, the more dilute portion, and the more concentrated portion, can be varied within fairly wide limits, without departing from the nature of this invention, provided that the mixture of the starch, or the like, with the more dilute portion of sulphuric acid is obtained without gelatinization and formation of lumps, and that the addition of the more concentrated portion of sulphuric acid takes place with sufficient rapidity and whilst avoiding too great a rise of temperature. For instance, it is not advisable to employ sulphuric acid of too high a concentration for running into the preliminary mixture of starch with dilute sulphuric acid, because the higher the concentration of such sulphuric acid, the greater will be the amount of heat developed on running it into the said preliminary mixture. Also, the more dilute portion of sulphuric acid, used for admixture with the starch, or the like, should preferably not be chosen too dilute, since the subsequent addition of the more concentrated portion of sulphuric acid will give rise to a higher temperature, in accordance with the amount of water contained in the said dilute portion of sulphuric acid. For this reason it is generally preferred to employ dilute sulphuric acid of a strength approaching 30% by weight.

The following is an example of the manner in which this invention may be performed, but the invention is not limited to this example. The parts are by weight.

Add fourteen parts of powdered starch, or starchy matter, to fifteen parts of sulphuric acid, containing 28 per cent $H_2SO_4$, stirring the mixture well, and maintaining it at a temperature of about 28° to 30° centigrade. A fine paste of a creamy consistency is obtained. Then allow fourteen parts of sulphuric acid (containing 77 per cent $H_2SO_4$) to flow in rapidly, the time taken for the addition being, say, one minute, or less. The stirring and cooling should be carried on continuously. The whole mixture becomes very thick, but, after two, or three, minutes, it commences to liquefy. After continued stirring for a few hours, a clear homogeneous liquid is obtained.

Although I have referred to the use of the product for the setting bath used in making artificial silk and the like from viscose, it is to be understood that the product is not limited to this use, but may be employed for any purpose for which it is applicable.

In the following claims I use the word "starch" in a sense broad enough to include any starchy matter which can be advantageously treated in accordance with the invention.

What I claim is:—

1. The process of making mixtures of starch and sulphuric acid, consisting in mixing the starch, in a finely divided condition, with sulphuric acid of such dilution, and at such moderate temperature, that no gelatinization takes place, and then rapidly adding, whilst stirring, a quantity of concentrated sulphuric acid sufficient to yield, on continued stirring, a homogeneous product of the desired concentration.

2. The process of making mixtures of starch and sulphuric acid, consisting in mixing the starch, in a finely powdered condition, with dilute sulphuric acid containing about 28 per cent of $H_2SO_4$, and at a temperature of about from 20° to 30° centigrade, and then rapidly adding, whilst stirring, a quantity of concentrated sulphuric acid containing about 77 per cent of $H_2SO_4$, and continuing stirring and cooling until a clear homogeneous product has been obtained.

3. The process of making mixtures of starch and sulphuric acid, consisting in mixing the starch, in a finely divided condition, with dilute sulphuric acid containing from about 20 to 30 per cent of $H_2SO_4$ at a temperature not exceeding 30° centigrade, and then adding, as rapidly as possible, and whilst stirring, a quantity of concentrated sulphuric acid containing at least 70 per cent $H_2SO_4$, sufficient to cause the yield of a clear homogeneous product containing not less than 75 parts by weight of sulphuric acid to every 100 parts by weight of starch.

In testimony whereof I have signed my name to this specification in the presence of two subscribing witnesses.

WILLIAM HENRY STOKES.

Witnesses:
HORACE JAMES HEGAN,
JOHN ALEXANDER LLOYD.